United States Patent
Baritaux et al.

(10) Patent No.: US 10,788,427 B2
(45) Date of Patent: Sep. 29, 2020

(54) METHOD FOR ACQUIRING A SPECTRUM

(71) Applicant: Commissariat a l'energie atomique et aux energies alternatives, Paris (FR)

(72) Inventors: Jean-Charles Baritaux, Seyssinet-Pariset (FR); Emmanuelle Schultz, Saint Egreve (FR); Veronique Rebuffel, Corenc (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 268 days.

(21) Appl. No.: 15/951,549

(22) Filed: Apr. 12, 2018

(65) Prior Publication Data

US 2018/0299384 A1    Oct. 18, 2018

(30) Foreign Application Priority Data

Apr. 14, 2017    (FR) ...................................... 17 53311

(51) Int. Cl.
*G01N 21/65* (2006.01)
*G01J 3/44* (2006.01)
*G01N 21/64* (2006.01)

(52) U.S. Cl.
CPC ............ *G01N 21/65* (2013.01); *G01J 3/4412* (2013.01); *G01N 21/6486* (2013.01); *G01N 2021/656* (2013.01)

(58) Field of Classification Search
CPC ........ G01N 21/65; G01N 21/6486; G01J 3/44
See application file for complete search history.

(56) References Cited

U.S. PATENT DOCUMENTS

2005/0043902 A1*  2/2005  Haaland ............... G01N 21/274
                                                                    702/30
2006/0055919 A1*  3/2006  Lee ........................... G01J 3/44
                                                                    356/301

(Continued)

FOREIGN PATENT DOCUMENTS

WO    WO 2016/003371 A1    1/2016

OTHER PUBLICATIONS

French Preliminary Search Report dated Dec. 20, 2017 in French Application 17 53311 filed on Apr. 14, 2017 (with English Translation of Categories of Cited Documents and Written Opinion).

(Continued)

*Primary Examiner* — Maurice C Smith
(74) *Attorney, Agent, or Firm* — Oblon, McClelland, Maier & Neustadt, L.L.P.

(57) ABSTRACT

The invention is an iterative method for acquiring a spectrum of a particle that is subjected to an illumination. It may in particular be a Raman spectrum. The method includes successively acquiring spectra that are what are called elementary spectra. These elementary spectra are combined to form a combined spectrum, which may be obtained by summing said elementary spectra. With each elementary spectrum is associated an acceptance criterion that is representative of a variation between said elementary spectrum and the elementary spectra acquired beforehand. Depending on this acceptance criterion, the elementary spectrum is either rejected, or accepted, in which case it is added to the combined spectrum. The invention makes it possible to guard against a degradation of the particle under the effect of an excessive exposure to said illumination.

18 Claims, 6 Drawing Sheets

(56) References Cited

U.S. PATENT DOCUMENTS

| | | | |
|---|---|---|---|
| 2007/0175278 A1* | 8/2007 | Puppels | G01N 21/65 |
| | | | 73/570 |
| 2007/0216900 A1* | 9/2007 | Dalrymple | G01J 3/28 |
| | | | 356/326 |
| 2009/0210194 A1* | 8/2009 | Ritter | G01N 21/35 |
| | | | 702/179 |
| 2011/0144922 A1* | 6/2011 | Corbett | G01N 23/2076 |
| | | | 702/28 |
| 2015/0062575 A1* | 3/2015 | Thurston | G01N 21/65 |
| | | | 356/301 |
| 2015/0066377 A1* | 3/2015 | Parchen | G06K 9/00536 |
| | | | 702/19 |
| 2015/0335248 A1 | 11/2015 | Huang et al. | |
| 2017/0138860 A1 | 5/2017 | Huang | |

OTHER PUBLICATIONS

Butler, H. et al. "Using Raman spectroscopy to characterize biological materials", Nature Protocols, vol. 11, No. 4, 2016, pp. 24.

* cited by examiner

METHOD FOR ACQUIRING A SPECTRUM

TECHNICAL FIELD

The technical field of the invention is the acquisition of a spectrum from light radiation emitted or scattered by a particle, and in particular a biological particle, in response to an illumination with light radiation.

PRIOR ART

Raman spectroscopy is a very widespread characterizing tool that is based on acquisition of a spectrum, called the Raman spectrum, of radiation scattered, inelastically, by a sample, the sample being exposed to monochromatic incident light radiation. A Raman spectrum generally takes the form of a spectrum of the variation in the wave number of the radiation scattered by the sample as a function of the wave number of the monochromatic light radiation. This spectrum represents a signature of energy transitions of molecules from which the analyzed sample is composed.

The intensity of scattered Raman signals is low and hence to acquire an exploitable Raman spectrum the incident radiation must be intense. This radiation is generally emitted by a laser source, the power of which is adjusted. Under the effect of excessively long exposure to the incident radiation, the analyzed sample may degrade. This degradation, which is not always perceivable by eye, may cause a structural modification of the sample, such modifications being referred to by the term photo-damage or the term photo-degradation. Thus, when a sample has been overexposed, the Raman spectrum obtained is no longer representative of the structure of the sample.

As a result of the above, the intensity of the incident radiation must be high enough to obtain an exploitable Raman spectrum while remaining below a certain threshold, called the exposure threshold, so as not to compromise the integrity of the sample. Such a compromise is difficult to establish a priori, on the one hand because the nature of the sample is not known, and on the other hand because the exposure threshold may vary between two samples of different natures.

Apart from the intensity of the incident radiation, the duration of the exposure is also important and it has been observed that beyond a certain integrated exposure, a photo-damage effect appears. It is therefore necessary to optimize both the power of the incident radiation and the duration of the exposure of the sample to the incident radiation.

A first conservative approach consists in adjusting the power to a level far below the exposure threshold. However, this may lead to the obtainment of spectra that are not very representative, obtained over a long acquisition time.

The aim of the invention is to address this problem by providing an acquiring method that allows the exposure of an analyzed sample to be optimized while avoiding the risk of an excessive exposure degrading the spectrum resulting.

SUMMARY OF THE INVENTION

A first subject of the invention is a method for acquiring a spectrum representative of a particle comprising:
  illuminating the particle with a light source;
  detecting light radiation emitted or scattered by said particle under the effect of the illumination and acquiring a spectrum from the detected light radiation;
the method being characterized in that the acquisition of the spectrum comprises the steps of:

i) acquiring a first elementary spectrum and forming an initial combined spectrum from the first elementary spectrum;
ii) acquiring what a current elementary spectrum;
iii) taking into account a reference spectrum;
iv) determining an acceptance criterion of the current elementary spectrum, the acceptance criterion corresponding to a deviation between the current elementary spectrum and the reference spectrum;
v) depending on the acceptance criterion:
  accepting the current elementary spectrum and updating the combined spectrum by adding the current elementary spectrum to the initial combined spectrum or to the combined spectrum resulting from a preceding iteration;
  or rejecting the current elementary spectrum;
vi) reiterating ii) to vi), or exiting from the iteration;
vii) determining a spectrum, representative of the particle, depending on the combined spectrum obtained in v) of the last iteration.

With each iteration is associated a combined spectrum. In the first iteration, the combined spectrum is the initial combined spectrum established in step i). From the second iteration, the combined spectrum is the combined spectrum resulting from the preceding iteration.

In step iv), the acceptance criterion may be determined depending on a comparison between the current elementary spectrum and the reference spectrum. The comparison may in particular comprise a subtraction, a ratio, a correlation product, a scalar product.

According to one embodiment, the reference spectrum is an average spectrum, representative of an average of elementary spectra forming the initial combined spectrum or the combined spectrum resulting from a preceding iteration. The average spectrum may then be established on the basis of a normalization of elementary spectra forming the combined spectrum, depending on an acquisition time of each elementary spectrum forming the combined spectrum taken into account in an iteration or each iteration.

According to one embodiment, in iv), the acceptance criterion is determined on the basis of a subtraction of the reference spectrum and of the current elementary spectrum, this subtraction preferably being normalized by an indicator of the noise in the reference spectrum and in the current elementary spectrum.

The reference spectrum may also be:
  the first elementary spectrum, acquired in step i), or an elementary spectrum acquired in a preceding iteration;
  or a spectrum determined a priori. The a priori spectrum may in particular correspond to the spectrum representative of a target particle.

According to one embodiment, the reference spectrum includes one or more regions of interest, called reference regions of interest of the current elementary spectrum. The acceptance criterion may then be established via a comparison of the current elementary spectrum, in at least one selected region of interest, with the reference spectrum. For example, the selected region of interest is representative of a spectral band that is liable to deform when the particle is illuminated with an excessive illumination, and at least one reference region of interest borders said spectral band.

According to one embodiment, in step v), the combined spectrum is updated with a sum, which is optionally weighted:
  of the current elementary spectrum and of the initial combined spectrum or of the combined spectrum resulting from a preceding iteration;

or of the current elementary spectrum, to which processing is applied, and the initial combined spectrum or the combined spectrum resulting from a preceding iteration.

According to one embodiment, in step vi), the iteration criterion corresponds:
to a preset number of iterations;
and/or to the obtainment of a preset number of rejections of current elementary spectra;
and/or to the obtainment of a preset number of events in the combined spectrum resulting from step v).

According to one embodiment, in step ii), each current elementary spectrum is acquired with the same acquisition time. According to another embodiment, at least two current elementary spectra are acquired with two different acquisition times.

According to one embodiment, following the first iteration, step ii) includes a step of determining an acquisition time of the current spectrum depending on the value of an acceptance criterion resulting from step iii) of a preceding iteration, or depending on the signal-to-noise ratio of the combined spectrum resulting from the preceding iteration, or the variation thereof.

According to one embodiment, the light source generates an illuminating beam that propagates as far as to the particle. Following the first iteration, step ii) includes a step of determining a power of the illuminating beam depending on the value of an acceptance criterion resulting from step iv) of a preceding iteration.

According to one embodiment, at least two current elementary spectra are acquired when the particle is illuminated with an illuminating beam of two different powers.

The photodetector may be a Raman spectrometer, the acquired spectrum being a Raman spectrum representative of the particle. The photodetector may be a fluorescence spectrometer, the acquired spectrum being a fluorescence spectrum of the particle.

Another subject of the invention is a device for analyzing a particle, including:
a light source;
a holder configured to receive a particle;
a photodetector configured to detect a response signal, emitted by the particle when it is illuminated by the light source and to form therefrom a spectrum; and
a processor that is configured to implement steps i) to vii) of the method described herein, on the basis of a plurality of elementary spectra acquired by the photodetector, in order to form a spectrum representative of the particle.

Other advantages and features will become more clearly apparent from the following description of particular embodiments of the invention, which are given by way of nonlimiting example, and shown in the appended drawings, which are listed below.

DESCRIPTION OF PARTICULAR EMBODIMENTS

Figure 1:
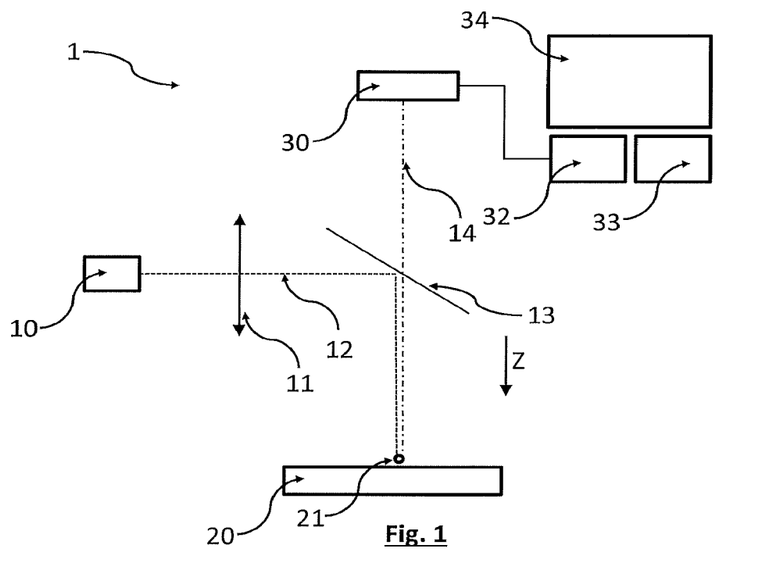
FIG. 1 shows an example of a Raman spectroscopy device.

FIG. 1 is an example of an embodiment of a device 1 allowing the invention to be implemented. A laser light source 10 is able to generate an illuminating beam 12, which is preferably monochromatic, and which propagates as far as to a particle 21 to be analyzed, the particle being placed on a holder 20. An optical system 11 allows the illuminating beam 12 to be focused on the particle 21. A half-silvered mirror 13 redirects the illuminating beam 12 along a propagation axis Z. Under the effect of the illumination with the illuminating beam 12, the particle 21 produces a response light radiation 14. The response radiation 14 may be fluorescence radiation emitted by the particle under the effect of its illumination. It may also be radiation scattered by the particle, in particular by Raman scattering. In the example shown in FIG. 1, the response radiation 14 is scattered radiation. It is detected by a spectroscopic photodetector 30 that is configured to acquire therefrom a Raman scattering spectrum. In this example, the photodetector 30 is a Raman spectrometer manufactured by Tornado Spectral Systems under the reference HyperFluxU1. It is connected to a processor 32, for example a microprocessor, allowing instructions of the method described below to be implemented. The microprocessor is connected to a memory 33 in which these instructions are stored. It may also be connected to a display screen 34.

In this example, the acquired spectrum is a Raman spectrum taking the form of a graph of a Raman shift $\sigma$, which is a difference between the wave number $\sigma_{14}$ of the detected radiation 14 and the wave number $\sigma_{12}$ of the illuminating beam 12.

The analyzed particle 21 may be a biological species such as a cell or a microorganism, for example a bacterium, a yeast, a fungus or a spore. The particle 21 may also be a chemical molecule. It may be deposited on a holder 20 or be present in a medium, for example a solid or liquid culture medium. In the examples presented below, the sample is formed from a droplet of an aqueous solution, containing at least one species to be analyzed. The aqueous solution is for example distilled water deposited on a quartz slide. The solution evaporates and the species is analyzed after said solution has evaporated.

The laser power is adjusted so as to obtain an exploitable spectrum in a time shorter than 5 seconds, or even 1 second. The light power of the illuminating beam 12 may for example be 17 mW. It may also be variable. The wavelength of the illuminating beam is 532 nm.

Figure 2A:
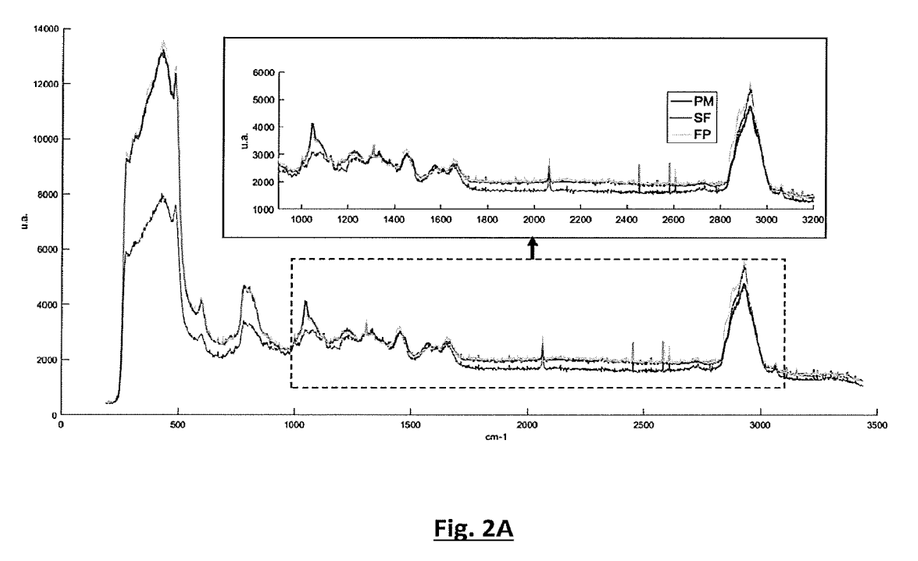
FIGS. 2A and 2B show Raman spectral signatures of bacteria before and after the latter have been degraded by an overexposure to light radiation, respectively.

FIG. 2A shows Raman spectra obtained for three species of bacteria (Proteus mirabilis, Shigella flexneri and Francisella pseudomonas), which are designated by the acronyms PM, SF and FP, respectively. The portion bounded by a box corresponds to the Raman-shift range including the main peaks of the signature of each bacterium. These peaks are here located between 650 cm$^{-1}$ and 1800 cm$^{-1}$ and between 2600 cm$^{-1}$ and 3200 cm$^{-1}$.

Figure 2B:
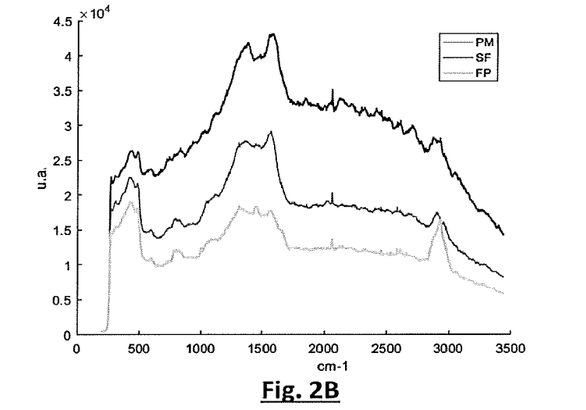

FIG. 2B shows Raman spectra obtained for the same species as above, the species having undergone an overexposure (photo-damage). In this case, the Raman spectrum acquired with the spectrometer contains no exploitable spectral information allowing each bacterium to be identified.

Figure 3A:
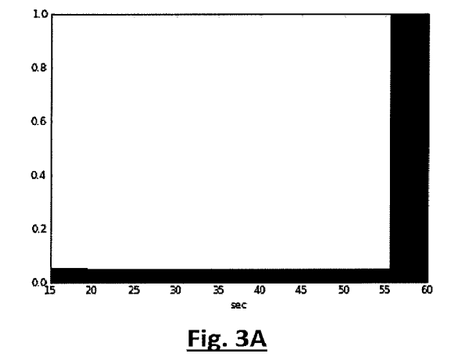
FIG. 3A illustrates the proportion of *Serratia marcescens* experiencing photo-damage as a function of a duration of exposure to a light beam.

The inventors have moreover observed that bacteria, or, generally, biological species, have a sensitivity to photo-degradation that differs depending on their nature. FIG. 3A shows the results of a study aiming to determine the sensitivity of the bacterium Serratia marcescens to an extended exposure to an illuminating beam of 17 mW optical power. For a plurality of bacteria, a Raman spectrum was obtained with various acquisition times. The proportion of bacteria that had undergone photo-damage was then determined. This proportion was determined by microscopy (overexposed bacteria were no longer visible or were cut into a plurality of portions) and by taking a Raman spectrum (degraded bacteria presented peaks characteristic of carbon). FIG. 3A shows the degradation rate (comprised between 0 and 1) of photo-degraded bacteria as a function of the duration of the exposure expressed in seconds. In FIG. 3A, it may be seen that, up to an exposure duration of 55 seconds, only 1 bacterium in 10 is degraded, this corresponding to a degradation rate of 0.1. After 60 seconds, all the bacteria are degraded, this corresponding to a degradation rate equal to 1.

Figure 3B:
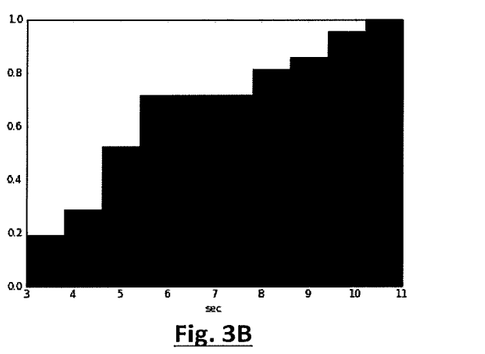
FIGS. 3B to 3C are similar figures to FIG. 3A, and relate to the species *Staphylococcus epidermidis* and *Bacillus subtilis*, respectively.
Figure 3C:
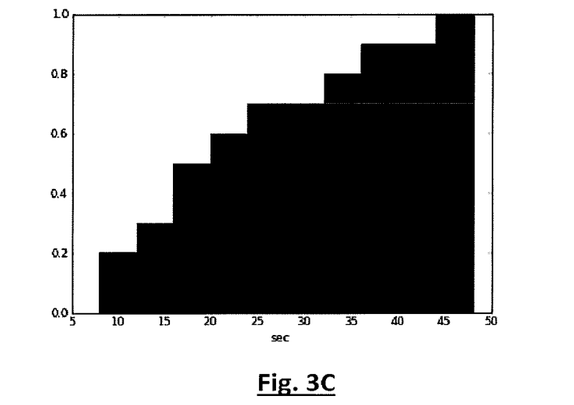

Using the same operating mode, trials were carried out on species of the Staphylococcus-epidermidis, and Bacillus-subtilis (BS) type. The results of these trials are presented in FIGS. 3B and 3C, respectively. It may be seen that the species Staphylococcus epidermidis is particularly fragile, since the degradation rate is 1 when the exposure duration reaches 11 seconds. These trials confirm that the sensitivity of a biological species with respect to an overexposure varies considerably depending on its constitution, certain species being more resistant than others.

The inventors have established an acquiring method allowing an optimal exposure of the analyzed species to be obtained without prior knowledge of the latter. Such an exposure allows a spectrum having peaks the signal-to-noise ratio of which is high to be obtained, without causing degradation of the species by overexposure. The main steps of this iterative method are described below, with reference to FIG. 4. Basically, this method aims to acquire, in succession, a plurality of spectra $S_i$ that are what are called elementary spectra, and to gradually form a combined spectrum $S_C$, by combining the various acquired elementary spectra. Each elementary spectrum is acquired during an acquisition time $T_i$ that is short enough for at least one elementary spectrum not to be affected by photo-damage and to thus be exploitable. The acquisition time is generally shorter than 5 s and is preferably shorter than 2 s. It may in particular be comprised between 200 ms and 2 s. Each elementary spectrum $S_i$ may then be added so as to form the combined spectrum $S_{C,i}$, until photo-damage is observed in an elementary spectrum.

Figure 4:
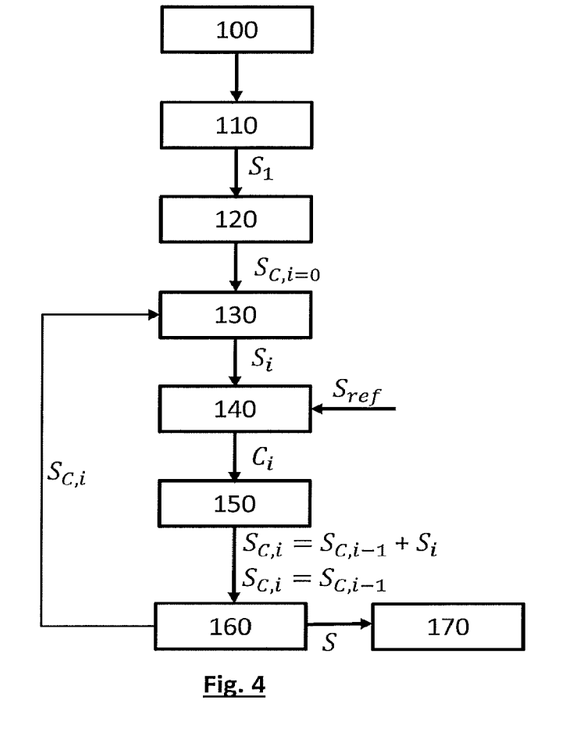
FIG. 4 shows the main steps of a method according to the invention.

Step 100: illuminating the species with the illuminating beam 12. The power of the illuminating beam may be modified between two successive acquisitions.

Step 110: acquiring a first spectrum $S_1$, called the first elementary spectrum, during a set first acquisition time $T_1$. This duration must be short enough to prevent any degradation of the examined species during this first acquisition. It may in particular be comprised between 100 ms and 5 s, and is preferably comprised between 200 ms and 2 s.

Step 120: forming an initial combined spectrum $S_{C,i=0}$, from the first elementary spectrum. The initial combined spectrum may in obtained from simple equality relationship, such that in the first iteration $S_{C,i=0}=S_1$.

Steps 130 to 160 are then carried out iteratively. Steps 110 and 120 are steps of initialization of this iterative method. The rank of the iteration is designated by the index i. After step 120, the index i has the value 2. To each iteration corresponds a combined spectrum $S_{C,i-1}$ obtained in a preceding iteration. In the first iteration, the combined spectrum is the initial combined spectrum $S_{C,i=0}$.

Step 130: acquiring an elementary spectrum $S_i$ called the current elementary spectrum. The term current designates the elementary spectrum acquired in iteration i. Each elementary spectrum $S_i$ may be acquired under the same acquisition conditions as the first elementary spectrum $S_1$, the optical power of the illuminating beam 12 being unchanged and the exposure duration $T_i$ being comprised in the same range of values as, or being identical to, the first acquisition time $T_1$.

As a variant, the power $P_i$ of the illuminating beam 12 during an acquisition i may be modulated i.e. increased or decreased. The same goes for the exposure duration $T_i$. These aspects are described in more detail below.

Step 140: definition of an acceptance criterion $C_i$ of the current elementary spectrum $S_i$ acquired in step 130.

The aim is to evaluate the relevance of the current elementary spectrum $S_i$, so as either to accept it, i.e. to take it into account in the subsequent steps, or to reject it. This step takes into account a reference spectrum $S_{ref}$. In this step, the current elementary spectrum $S_i$ is compared to the reference spectrum $S_{ref}$ so as to form an acceptance criterion $C_i$ associated with the current elementary spectrum $S_i$. The acceptance criterion $C_i$ represents a deviation of the current elementary spectrum $S_i$ with respect to the reference spectrum $S_{ref}$. When this deviation is too large, the current elementary spectrum is rejected. When the current elementary spectrum differs from the reference spectrum, the current elementary spectrum is assumed to be affected by photo-degradation and it is thus preferable not to take it into account. Examples of acceptance criteria are indicated below.

In this example, the reference spectrum $S_{ref}$ is formed by a spectrum, called the average spectrum, referenced $m_i$, that is formed by averaging a plurality of elementary spectra $S_1 \ldots S_{i-1}$ acquired in the preceding iterations. This example is detailed below.

The reference spectrum $S_{ref}$ may also be formed by a current elementary spectrum $S_{i-1}$, $S_{i-2}$ acquired in a preceding iteration. It may be the elementary spectrum $S_{i-1}$ acquired in the preceding iteration. The acceptance criterion $C_i$ then allows a deviation between the current elementary spectrum and one or more of the most recently acquired current elementary spectra to be determined.

The reference spectrum $S_{ref}$ may be a preset spectrum, for example a spectrum representative of a target particle that it is desired to verify corresponds to the analyzed particle. The acceptance criterion may then quantify a correlation between the reference spectrum $S_{ref}$ and the current elementary spectrum $S_i$, for example by way of a scalar product of the two spectra.

The reference spectrum $S_{ref}$ may also be formed by one or more regions of interest $ROI_{ref}$, called reference regions of interest, of the current elementary spectrum $S_i$. In this case, the acceptance criterion may correspond to a deviation between a selected region of interest $ROI_s$ of the current elementary spectrum $S_i$, and the reference regions of interest $ROI_{ref}$ of the current elementary spectrum. In other words, according to this variant, the acceptance criterion includes a comparison between a (or more than one) selected region(s) of interest $ROI_s$ of the current elementary spectrum and a (or more than one) reference region(s) of interest $ROI_{ref}$ of the current elementary spectrum. For example, a selected region of interest $ROI_s$ corresponds to a spectral band in which a peak, or a deformation of the spectrum, may appear during the appearance of photo-damage. The reference regions of interest $ROI_{ref}$ may lie on either side of the selected region of interest. Comparison of the selected region of interest $ROI_s$ and the reference regions of interest $ROI_{ref}$ of the current elementary spectrum allows the appearance of a peak, or of a deformation, resulting from the appearance of photo-damage, to be detected.

The acceptance criterion $C_i$ may be formed by a combination of a plurality of elementary acceptance criteria, each elementary acceptance criterion resulting from a comparison with a different reference spectrum.

Step 150: updating the combined spectrum. Depending on the value of the acceptance criterion $C_i$ determined in step 140, relatively to the reference spectrum $S_{ref}$, the current elementary spectrum $S_i$ is either accepted, or rejected. In the case where it is accepted, the combined spectrum $S_{C,i}$ is updated with a sum with the combined spectrum obtained in the preceding iteration i−1, the sum optionally being weighted. Thus, $S_{C,i}=S_{C,i-1}+p_i S_i$ (1), where $p_i$ is a weighting term. The weighting term is generally equal to 1.

The current elementary spectrum $S_i$ may be subject to processing before being added to the combined spectrum $S_{C,i-1}$ obtained in the preceding iteration. Examples of possible types of processing are for example smoothing and/or baseline subtraction. When the power $P_i$ of the illuminating beam 12 varies between the various iterations, the elementary spectrum may be corrected with a correcting function $f_i$ taking into account said power. Such a correcting function in particular allows the acquired spectrum to be normalized with respect to a preset power value, for example a unitary value. Such a normalization is described in detail below.

When the current elementary spectrum $S_i$ is rejected, the combined spectrum $S_{C,i}$ does not change and remains such as it was before the acquisition of the current elementary spectrum: $S_{C,i}=S_{C,i-1}$ (1').

By "comparison of the current elementary spectrum $S_i$ and a reference spectrum $S_{ref}$", what is meant is an operation implementing a subtraction or a ratio, the subtraction or ratio possibly being normalized. It may also involve a calculation of a quantity expressing a correlation between the two spectra, for example by way of a scalar product of vectors representing the current elementary spectrum and the reference spectrum, respectively.

Step 160: reiterating or exiting from the algorithm. Provided that an iteration-termination criterion has not been reached, the method reiterates steps 130 to 160, while incrementing the iteration index i, so as to allow the combined spectrum $S_{C,i}$ to be updated with a new current elementary spectrum $S_i$. When the iteration-termination criterion is met, the method passes to step 170.

The iteration-termination criterion may be a preset number $N_i$ of iterations i. The iteration-termination criterion may also be established depending on the acceptance criterion $C_i$ calculated in step 140. Thus, the iteration-termination criterion may be considered to be met when a current elementary spectrum $S_i$ is rejected. In other words, provided that each current elementary spectrum is accepted, the iterations continue and the combined spectrum $S_{C,i}$ is updated in each iteration, by combination with each current elementary spectrum $S_i$. When a current elementary spectrum is rejected, the observed species is considered to have undergone photo-degradation. From this point on, the current elementary spectrum $S_i$ is considered to no longer be representative of the analyzed species 21 and the formation of the combined spectrum $S_{C,i}$ is stopped. The iteration-termination criterion may also be met when a plurality of successive elementary spectra are rejected, for example 2 or 3 successive elementary spectra. The iteration criterion may also correspond to a maximum number of detections counted in one or more peaks of the combined spectrum.

Step 170: on the basis of the combined spectrum $S_{C,i}$ obtained in the last iteration, i.e. in the step 150 preceding said step 170, a spectrum S representative of the analyzed species 21 is established. This spectrum may be obtained via a simple equality relationship, such that $S=S_{C,i}$.

A spectrum S of the analyzed species is thus formed by gradually combining elementary spectra $S_i$. The cumulative acquisition time of this spectrum is: $T=\Sigma_i T_i$

EXAMPLES OF ACCEPTANCE CRITERIA

As indicated above, the acceptance criterion $C_i$ associated with each current elementary spectrum $S_i$ represents a deviation of each current elementary spectrum $S_i$ with respect to a reference spectrum $S_{ref}$. The reference spectrum may be
 - the elementary spectrum $S_{i-1}$ acquired in the preceding iteration;
 - an average spectrum $m_i$, calculated by taking an average of elementary spectra $S_1 \ldots S_{i-1}$ forming the combined spectrum $S_C$;
 - the combined spectrum $S_C$, the latter being divided by the acquisition time $T_i$ of the current spectrum $S_i$ According to one example, the reference spectrum $S_{ref}$ is an average spectrum $m_i$ obtained by averaging all of the i−1 elementary spectra $S_1 \ldots S_{i-1}$ forming the combined spectrum prior to the acquisition of the current elementary spectrum $S_i$. Thus, an acceptance criterion $C_i$ may be established such that:

$$C_i = \frac{1}{K} \sum_k \frac{|S_{k,i} - m_{k,i}|}{\sqrt{\sigma_{s,k,i}^2 + \sigma_{m,k,i}^2}} \qquad (2)$$

K is the number of channels considered in the sum. It may be all of the channels of the spectrum or of certain thereof;
k designates each channel;

$S_{k,i}$ and $m_{k,i}$ are the values, in a channel k, of the current elementary spectrum $S_i$ and of the average spectrum $m_i$, respectively; and $\sigma_{s,k,i}$ and $\sigma_{m,k,i}$ are the standard deviation, in a channel k, of the current elementary spectrum $S_i$ and of the average spectrum $m_i$, respectively. Each of these standard deviations is determined by considering the channels located in a vicinity $V_k$ of the channel k. The vicinity $V_k$ represents a number of channels $N_{V_k}$ neighbouring the channel k. The number of channels $N_{V_k}$ is for example equal to 7, lying on either side of the channel k.

When the acquisition times of the elementary spectra $S_1 \ldots S_{i-1}$ are identical, the value $m_{k,i}$, in each channel k, of the average spectrum $m_i$ may be:

$$m_{k,i} = \frac{1}{i-1}\sum_{j=1}^{i-1} S_{k,j}. \quad (3)$$

When the acquisition times of the various elementary spectra are variable, the value $m_{k,i}$, in each channel k, of the average spectrum $m_i$ may be:

$$m_{k,i} = \frac{1}{i-1}\sum_{j=1}^{i-1} S_{k,j}^{norm}. \quad (4)$$

$S_{k,j}^{norm}$ is a normalized spectrum, taking into account a unitary acquisition time, with, when the power of the light beam is constant:

$$S_{k,j}^{norm} = \frac{1}{T_j} S_{k,j}. \quad (5)$$

When the power of the light beam used to obtain the elementary spectra varies, it is possible to establish a correcting function so as to obtain, from each measured spectrum, a normalized spectrum each channel k of which has the value $$S_{k,j}^{norm} = \frac{1}{T_j} f_j(S_{k,j}), \quad (6)$$

where $f_j$ is a correcting function that is established experimentally, and that takes into account the power $P_j$ of the illuminating beam 12 during the acquisition of an elementary spectrum $S_j$. The correction function may be established in a calibrating phase on a calibrating object, by modulating the power of the illuminating beam 12 on the calibrating object and by comparing the obtained spectra.

It will be noted that the sum established in equation (2), or in equation (7) below, may be restricted to channels present in one or more regions of interest ROI of the spectrum. These regions of interest may have been preset.

Another expression of the acceptance criterion is:

$$C_i = \frac{1}{K} \sum_k \frac{|\bar{s}_{k,i}^I - \bar{m}_{k,i}^I|}{\sqrt{\sigma'^2_{s,k,i} + \sigma'^2_{m,k,i}}} \quad (7)$$

where $\overline{S}_{k,i}^I$ is the average value, in the channel k, of a smoothed spectrum $S_i^I$ obtained after smoothing of each elementary spectrum $S_i$, said average value being calculated from the values in channels located in a vicinity $V_k$ of the channel k of the smoothed spectrum $S_i^I$;

$\overline{m}_{k,i}^I$ is the average value, in the channel k, of an average smoothed spectrum $m_i^I$ obtained by calculating an average of smoothed spectra $S_1^I \ldots S_{i-1}^I$ respectively obtained by smoothing each elementary spectrum $S_1 \ldots S_{i-1}$. The average value $\overline{m}_{k,i}^I$ is calculated from the values in channels located in a vicinity $V_k$ of the channel k of the average smoothed spectrum $m_i^I$. The average smoothed spectrum $m_i^I$ is obtained, from the smoothed spectra $S_1^I \ldots S_{i-1}^I$ by implementing one of the equations (3) to (5);

$\sigma'^2_{s,k,i}$ is a noise standard deviation, calculated from the values in channels located in a vicinity $V_k$ of the channel k, of a noise spectrum $S'_i$. The noise spectrum $S'_i$ is obtained, from the elementary spectrum $S_i$ and from the smoothed spectrum $S_i^I$, for example via a subtraction according to the expression:

$$S'_i = S_i - S_i^I \quad (8);$$

$\sigma'^2_{s,k,i}$ may be estimated using the following expression:

$$\sigma'^2_{s,k,i} = \frac{1}{N_{V_k}} \sum_{j \in V_k} S'^2_{j,k}; \quad (9)$$

$\sigma'^2_{m,k,i}$ is the average noise standard deviation, calculated from the values in channels located in a vicinity $V_k$ of the channel k of an average noise spectrum $m'_i$. The average noise spectrum is obtained, from the average spectrum $m_i$ and from the average smoothed spectrum $m_i^I$, for example via a subtraction, according to the expression:

$$m'_i = m_i - m_i^I \quad (10);$$

$\sigma'^2_{m,k,i}$ may be estimated using the following expression:

$$\sigma'^2_{m,k,i} = \frac{1}{N_{V_k}} \sum_{j \in V_k} m'^2_{j,k} \quad (11)$$

Those skilled in the art will be able to define other acceptance criteria than those described with reference to expressions (2) and (7).

Moreover, expressions (2) and (7) may be applied to reference spectra $S_{ref}$ other than the average spectrum $m_i$.

When the acceptance criterion $C_i$ exceeds a previously defined certain threshold, the current elementary spectrum $S_i$ is rejected. When the acceptance criterion $C_i$ is below said threshold, the current elementary spectrum $S_i$ is accepted and combined with the combined spectrum $S_{C,i-1}$ resulting from the preceding iteration.

According to one embodiment, the acquisition time $T_i$ of a current elementary spectrum $S_i$ is determined depending on the value of the acceptance criterion $C_{i-1}$ established in the preceding iteration. Depending on this value, the acquisition time may be increased or decreased. For example, if the acceptance criterion is getting close to the rejection threshold, the acquisition time may be decreased.

According to one embodiment, the power $P_i$ of the illuminating beam 12, during the acquisition of a current spectrum $S_i$, is determined depending on the value of the acceptance criterion $C_{i-1}$ established in the preceding iteration. Depending on this value, the power of the illuminating beam 12 may be increased or decreased. For example, if the acceptance criterion is getting close to the rejection threshold, the power of the illuminating beam may be decreased. The power of the illuminating beam may also be modulated according to a predefined sequence.

The modulation of the power of the illuminating beam is particularly advantageous when the analyzed particle might be a bacterium in the spore or non-sporulated state. The inventors have observed that it is necessary, to obtain an exploitable Raman spectrum from a spore, for the illuminating power to be relatively low, whereas a higher power is necessary to obtain an exploitable Raman spectrum from a non-sporulated bacterium. Thus, when the examined particle is unknown, it is best to carry out the first acquisitions at a relatively low power, for example 7 mW, then to gradually increase the power over the course of the iterations, for example to 12 mW, then 20 mW, then 40 mW.

The modulation of the acquisition time and/or power may also be determined, in each iteration, depending on a signal-to-noise ratio of the combined spectrum updated in the preceding iteration.

According to one embodiment, when a current elementary spectrum is accepted, it undergoes a smoothing operation before being added to the combined spectrum resulting from the preceding iteration $S_{C,i-1}$. Thus, the combined spectrum, resulting from each iteration, is obtained by adding a smoothed current elementary spectrum, expression (1) being replaced by: $S_{C,i} = S_{C,i-1} + S_i^l$ (12). Apart from a simple smoothing, the current spectrum may undergo other processing operations known to those skilled in the art before being added to the combined spectrum $S_{C,i-1}$, for example a baseline-removal operation.

Figure 5A:
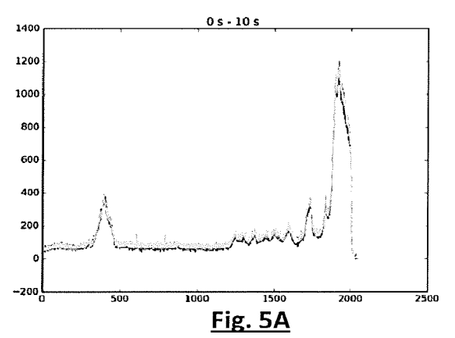
FIGS. 5A, 5B and 5C show the variation in a Raman spectrum obtained by combining elementary spectra of a bacterium, each elementary spectrum being acquired at various times starting from an initial time from which the bacterium is exposed to an illuminating beam. The acquisition time of each elementary spectrum is 1 second.
Figure 5B:
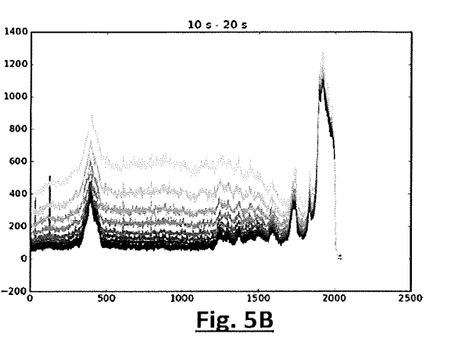
Figure 5C:
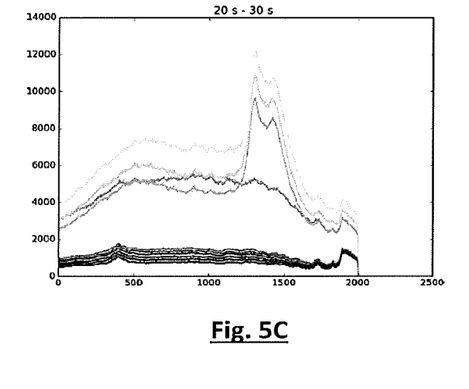

FIGS. 5A to 5C illustrate elementary spectra $S_i$ being acquired during an acquisition time $T_i$ of 1 second from a bacterium of *Serratia-marcescens* type.

FIG. 5A shows 10 elementary spectra $S_i$ of 1 second acquired between an initial time $t=0$ s and $t=1$ s, between $t=1$ s and $t=2$ s, between $t=2$ s and $t=3$ s ... $t=9$ s and $t=10$ s, respectively. It may be seen that each elementary spectrum is repetitive. Thus, between the ten first seconds of exposure, the bacterium did not undergo photo-degradation.

FIG. 5B shows 10 elementary spectra $S_i$ of 1 second acquired between the times $t=10$ s and $t=11$ s, between $t=11$ s and $t=12$ s, between $t=12$ s and $t=13$ s ... $t=19$ s and $t=20$ s, respectively. It may be seen that the spectra gradually degrade, in particular starting from $t=15$ s, bearing witness to a photo-degradation.

FIG. 5C shows 10 elementary spectra $S_i$ of 1 second acquired between the times $t=20$ s and $t=21$ s, between $t=21$ s and $t=22$ s, between $t=22$ s and $t=23$ s ... $t=29$ s and $t=30$ s, respectively. These spectra are no longer exploitable.

Figure 5D:
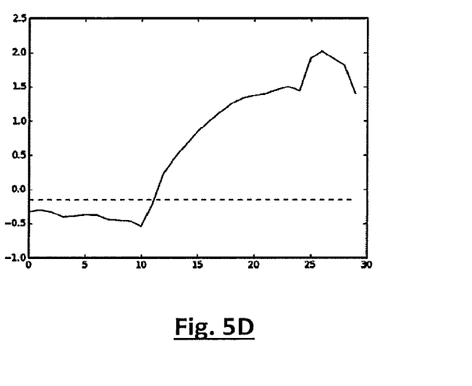
FIG. 5D shows the variation in an acceptance criterion calculated for each of the 30 spectra shown in FIGS. 5A to 5C.

FIG. 5D shows the variation in the logarithm of the acceptance criterion such as defined with reference to expression (2) and calculated on the basis of the elementary spectra shown in FIGS. 5A to 5C. When this logarithm exceeds −0.1 (dashed line), this corresponding to the twelfth acquisition, the elementary spectra are no longer considered to be representative of the analyzed bacterium. Thus, to obtain a spectrum representative of the bacterium, it is the elementary spectra acquired between $t=0$ s and $t=12$ s that should be accumulated.

The advantage of the method is that the acquisition time of a spectrum is not initially set and is optimized so as to maximize the number of elementary spectra that are representative of the bacterium. Thus, in contrast to the prior art, the cumulative acquisition time T self-adjusts, the acquisition being stopped on detection of a photo-degradation in one or more elementary spectra.

Figure 6A:
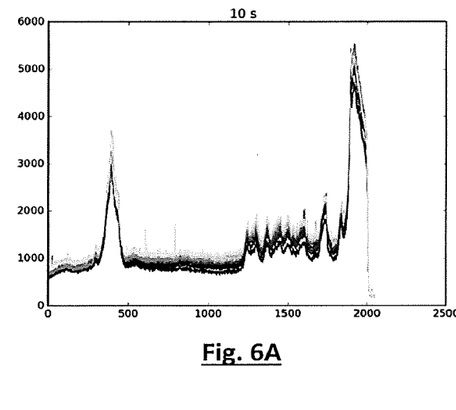
FIG. 6A shows a plurality of Raman spectra of a given species of bacterium, acquired under the effect of a continuous illumination of a duration of 10 seconds.
Figure 6B:
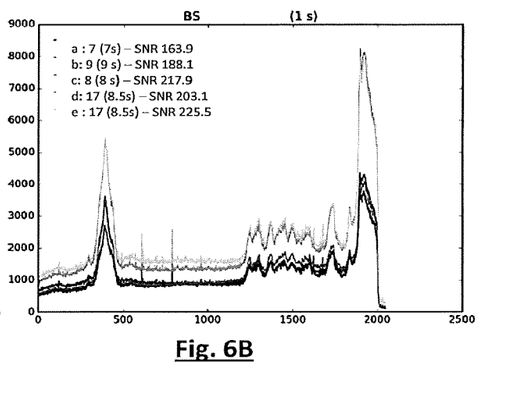
FIG. 6B shows various Raman spectra of the species of bacterium analyzed in FIG. 6A, each spectrum resulting from a successive acquisition of a plurality of elementary spectra, each elementary spectrum being acquired during a time period of 1 second.

The method described above has been tested on bacteria of *Bacillus-subtilis* type. FIG. 6A shows 4 Raman spectra acquired using a prior-art method, the acquisition time being set initially to 10 s. FIG. 6B shows 5 measured spectra S, measured according to the invention, among which:

two spectra correspond to an accumulation of 17 elementary spectra $S_i$ of 1 s duration, this corresponding to a cumulative accumulation duration of 17 s;

one spectrum is obtained by accumulating 9 elementary spectra $S_i$ of 1s duration, this corresponding to a cumulative accumulation duration of 9 s;

one spectrum is obtained by accumulating 8 elementary spectra $S_i$ of 1 s duration, this corresponding to a cumulative accumulation duration of 8 s;

one spectrum is obtained by accumulating 7 elementary spectra $S_i$ of 1 s duration, this corresponding to a cumulative accumulation duration of 7 s.

SNR is the signal-to-noise ratio of each spectrum S. One possible expression for the signal-to-noise ratio is:

$$SNR = \frac{\sqrt{\frac{1}{K_1}\sum_{k \in ROI_1}(S_k^l)^2}}{\sqrt{\frac{1}{K_2}\sum_{k \in ROI_2}(S'_k)^2}} \quad (12)$$

where:

$S_k^l$ is the content of each channel k of a smoothed spectrum $S^l$ obtained by smoothing the spectrum S resulting from the accumulation of the elementary spectra;

$S'_k$ is the content of each channel of a spectrum S' obtained by subtracting the smoothed spectrum $S^l$ from the spectrum S; and $ROI_1$ and $ROI_2$ designate regions of interest of the spectrum including $K_1$ and $K_2$ channels, respectively.

Figure 6C:
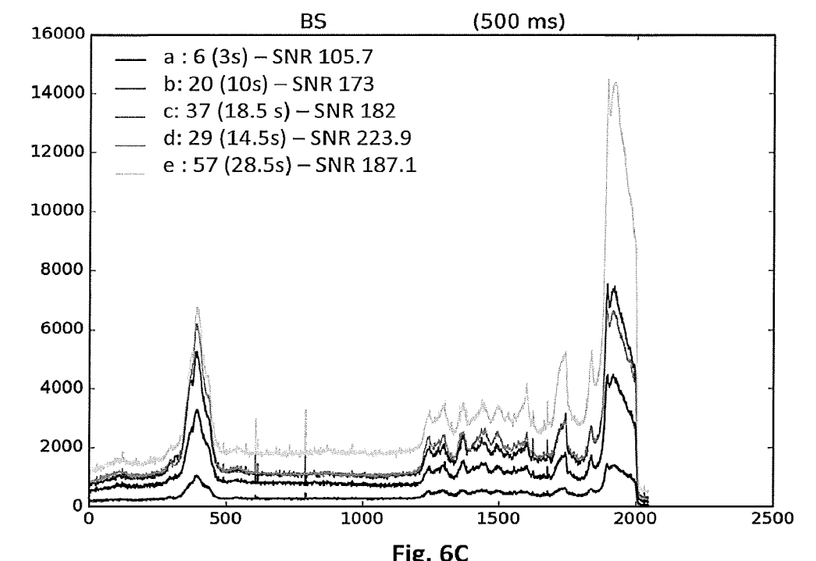
FIGS. 6C, 6D and 6E show various Raman spectra obtained under conditions analogous to those of FIG. 6B, the acquisition time of each elementary spectrum being 500 ms, 200 ms and 100 ms, respectively.

FIG. 6C shows 5 spectra S obtained by accumulating elementary spectra of 500 ms duration.

one spectrum is obtained by accumulating 57 elementary spectra $S_i$, this corresponding to a cumulative accumulation duration of 28.5 s;

one spectrum is obtained by accumulating 37 elementary spectra $S_i$, this corresponding to a cumulative accumulation duration of 18.5 s;

one spectrum is obtained by accumulating 29 elementary spectra $S_i$, this corresponding to a cumulative accumulation duration of 14.5 s;

one spectrum is obtained by accumulating 20 elementary spectra $S_i$, this corresponding to a cumulative accumulation duration of 10 s;

one spectrum is obtained by accumulating 6 elementary spectra $S_i$, this corresponding to a cumulative accumulation duration of 3 s, the latter spectrum having a low signal-to-noise ratio with respect to the preceding elementary spectra.

Figure 6D:
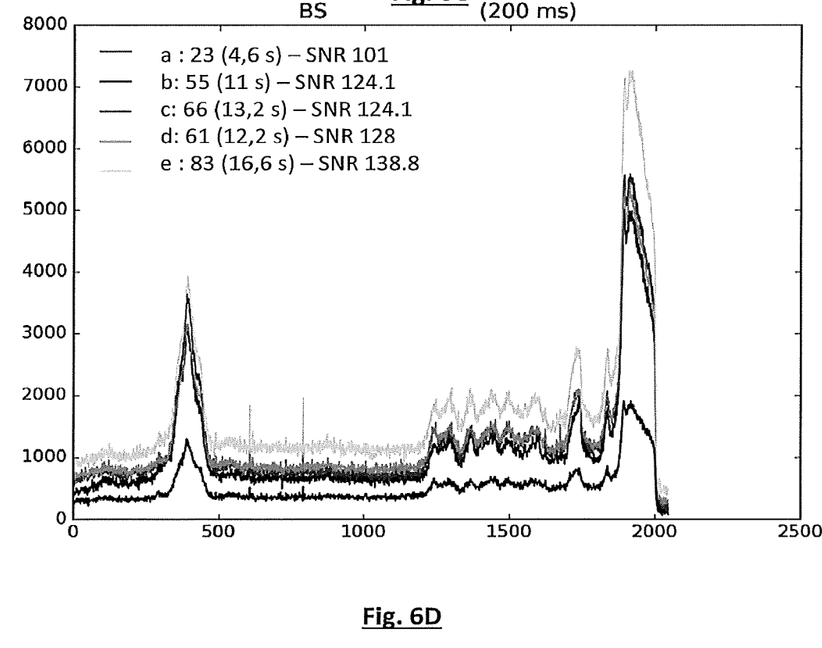

FIG. 6D shows 5 spectra S obtained by accumulating elementary spectra of 200 ms duration.

one spectrum is obtained by accumulating 83 elementary spectra $S_i$, this corresponding to a cumulative accumulation duration of 16.6 s;

one spectrum is obtained by accumulating 66 elementary spectra $S_i$, this corresponding to a cumulative accumulation duration of 13.2 s;

one spectrum is obtained by accumulating 61 elementary spectra $S_i$, this corresponding to a cumulative accumulation duration of 12.2 s;

one spectrum is obtained by accumulating 55 elementary spectra $S_i$, this corresponding to a cumulative accumulation duration of 11 s;

one spectrum is obtained by accumulating 23 elementary spectra $S_i$, this corresponding to a cumulative accumulation duration of 4.6 s, the latter spectrum having a low signal-to-noise ratio with respect to the preceding elementary spectra.

Figure 6E:
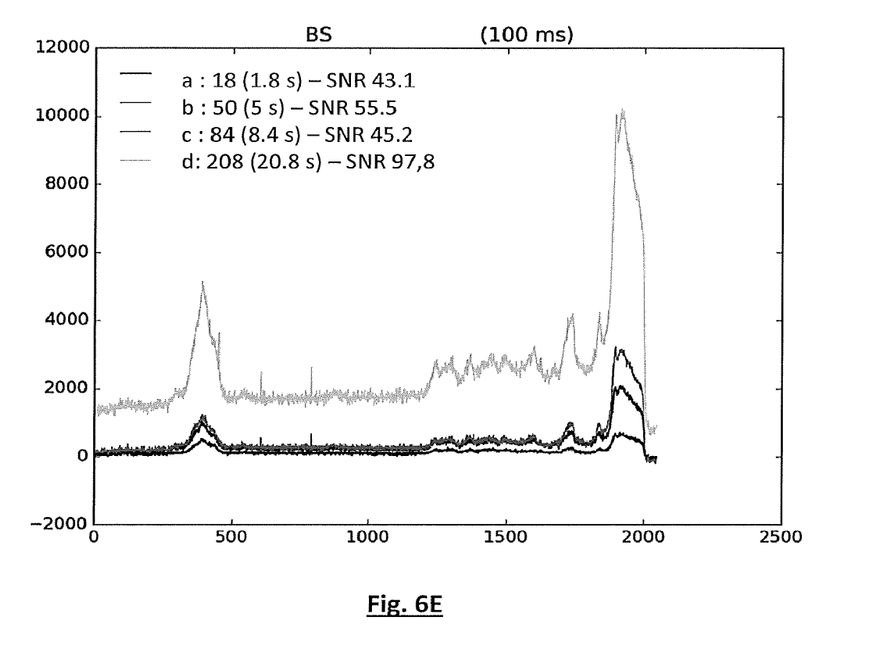

FIG. 6E shows 4 spectra S obtained by accumulating elementary spectra of 100 ms duration.

one spectrum is obtained by accumulating 208 elementary spectra $S_i$, this corresponding to a cumulative accumulation duration of 20.8 s;

one spectrum is obtained by accumulating 84 elementary spectra $S_i$, this corresponding to a cumulative accumulation duration of 8.4 s;

one spectrum is obtained by accumulating 50 elementary spectra $S_i$, this corresponding to a cumulative accumulation duration of 5 s;

one spectrum is obtained by accumulating 18 elementary spectra $S_i$, this corresponding to a cumulative accumulation duration of 1.8 s.

These figures illustrate the need to optimize the number of elementary spectra to be accumulated and the acquisition time of each elementary spectrum, if spectra the signal-to-noise ratio of which is optimal are to be obtained. It may be seen here that the accumulation of too many elementary spectra of low acquisition time, in the present case 100 ms, leads to the obtention of spectra having a quite unsatisfactory signal-to-noise ratio. This is due to the read noise of each elementary spectrum accumulating in the combined spectrum, this combined noise increasing as the number of combined elementary spectra increases.

With this type of bacterium, elementary acquisition times of 500 ms or 1 s lead to optimal results in terms of signal-to-noise ratio provided that the cumulative acquisition time exceeds 7 s. Moreover, it may be seen that the signal-to-noise ratio of spectra acquired according to the invention is similar to the signal-to-noise ratio of a spectrum acquired using a comparable acquisition time. It is known that, at equal acquisition time, a spectrum obtained by summing a plurality of elementary spectra has a lower signal-to-noise ratio than a spectrum acquired in a single acquisition. However, the experimental trials described above show that the difference is negligible, provided that the signal-to-noise ratio of each elementary spectrum is sufficient, in particular as regards read noise.

The invention was described in the context of analysis of bacteria but it is applicable to any other type of biological species, or even any other type of particle sensitive to overexposure. Moreover, it is also applicable to the acquisition of fluorescence spectra, the radiation 14 detected by the photodetector being fluorescence radiation the spectrum of which is acquired. In this case, the light source 10 is a source able to emit an illuminating beam 12 able to cause the emission of fluorescence radiation 14 by the analyzed species.

The invention is in particular applicable to the monitoring of bacterial cultures, to the inspection of biological samples, or to the inspection of samples sampled from the environment in the food-processing industry or other industrial fields.

The invention claimed is:

1. A method for acquiring a spectrum representative of a particle, comprising the following steps:

illuminating the particle with a light source;

detecting, using a photodetector, light radiation emitted or scattered by said particle under effect of the illuminating and acquiring a first elementary spectrum from the detected light radiation;

performing, in order, steps of:
   i) forming a combination spectrum from the acquired first elementary spectrum;
   ii) acquiring a current elementary spectrum;
   iii) taking into account a reference spectrum;
   iv) determining an acceptance criterion of the current elementary spectrum, the acceptance criterion corresponding to a deviation between the current elementary spectnim and the reference spectrum;
   v) depending on the acceptance criterion:
      accepting the current elementary spectrum and updating the combination spectrum by adding the current elementary spectrum to the combination spectrum resulting from step i), or to the combination spectrum resulting from a preceding iteration of steps ii) to v,
      or rejecting the current elementary spectrum;
   vi) reiterating steps ii) to v) if an iteration termination criterion has not been reached, otherwise exiting from the iteration and proceeding to step vii); and
   vii) determining the spectrum representative of the particle, depending on the combination spectrum obtained in v) of a final iteration before exiting.

2. The method according to claim 1, wherein, after the first iteration of steps ii) to v), the reference spectrum is an average spectrum, representative of an average of elementary spectra forming the combination spectrum resulting from the preceding iteration.

3. The method according to claim 2, wherein the average spectrum is established on the basis of a normalization of elementary spectra forming the combination spectrum, depending on an acquisition time of each elementary spectrum forming the combination spectrum taken into account in each iteration.

4. The method according to claim 1, wherein, in step iv), the acceptance criterion is determined on the basis of a subtraction of the reference spectrum and of the current elementary spectrum.

5. The method according to claim 4, wherein the subtraction is normalized by an indicator of noise in the reference spectrum and in the current elementary spectrum.

6. The method according to claim 1, wherein the reference spectrum is the first elementary spectrum, acquired in step i), or an elementary spectrum acquired in a preceding iteration.

7. The method according to claim 1, wherein the reference spectrum is a spectrum deteimined a priori.

8. The method according to claim 1, wherein the reference spectrum includes one or more regions of interest of the current elementary spectrum.

9. The method according to claim 8, wherein the acceptance criterion is established via a comparison of the current elementary spectrum, in at least one selected region of interest, with the reference spectrum.

10. The method according to claim 1, wherein, in step v), the combination spectrum is updated with a sum of:

the current elementary spectrum and the combination spectrum resulting from step i) or the combination spectrum resulting from the preceding iteration, or the current elementary spectrum, to which processing is applied, and the combination spectnim resulting from step i) or the combination spectrum resulting from the preceding iteration.

11. The method according to claim 10, wherein the sum is a weighted sum.

12. The method according to claim 1, wherein, in step vi), the iteration termination criterion corresponds:

a preset number of iterations, and/or to the obtainment of a preset number of rejections of current elementary spectra, and/or to the obtainment of a preset number of events in the combination spectrum resulting from step v).

13. The method according to claim 1, wherein, in step ii), each current elementary spectrum is acquired with a same acquisition time.

14. The method according to claim 1, wherein, following a first iteration of steps ii) to v), step ii) includes a step of determining an acquisition time of the current elementary spectrum, depending on [[the]] a value of an acceptance criterion resulting from step iii) of the preceding iteration.

15. The method according to claim 1, wherein the light source generates an illuminating beam that propagates as far as to the particle, and, following a first iteration of steps ii) to v), step ii) includes a step of determining a power of the illuminating beam depending on a value of the acceptance criterion resulting from step iv) of the preceding iteration.

16. The method according to claim 1, wherein the photodetector is a Raman spectrometer, the acquired first elementary spectrum and each current elementary spectrum being a Raman spectrum representative of the particle.

17. The method according to claim 1, wherein the photodetector is a fluorescence spectrometer, the acquired first elementary spectrum and each current elementary spectrum being a fluorescence spectrum of the particle.

18. A device for analyzing a particle, including:

a light source;

a holder configured to receive the particle;

a photodetector configured to detect a response signal, emitted by the particle when the particle is illuminated by the light source, and to form a spectrum therefrom; and a processor that is configured to implement steps i) to vii) of the method according to claim 1, on the basis of a plurality of elementary spectra acquired by the photodetector, so as to form a spectrum representative of the particle.

* * * * *

UNITED STATES PATENT AND TRADEMARK OFFICE
CERTIFICATE OF CORRECTION

PATENT NO. : 10,788,427 B2
APPLICATION NO. : 15/951549
DATED : September 29, 2020
INVENTOR(S) : Jean-Charles Baritaux et al.

Page 1 of 1

It is certified that error appears in the above-identified patent and that said Letters Patent is hereby corrected as shown below:

In the Claims

In Column 14, Line 21, Claim 1, delete "spectnim" and insert -- spectrum --,

In Column 14, Line 28, Claim 1, delete "v," and insert -- v), --,

In Column 14, Line 58, Claim 7, delete "deteimined" and insert -- determined --, In Column 15, Line 5, Claim 10, delete "spectnim" and insert -- spectrum --, In Column 15, Line 12, Claim 12, before "a preset number" insert -- to --, In Column 15, Line 23, Claim 14, after "depending on" delete "[[the]]".

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*